US009438807B2

(12) United States Patent
Ono

(10) Patent No.: US 9,438,807 B2
(45) Date of Patent: Sep. 6, 2016

(54) IMAGE PICKUP APPARATUS HAVING TOUCH PANEL, IMAGE PROCESSING METHOD, AND STORAGE MEDIUM

(71) Applicant: CANON KABUSHIKI KAISHA, Tokyo (JP)

(72) Inventor: Yasumasa Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/702,868

(22) Filed: May 4, 2015

(65) Prior Publication Data

US 2015/0326789 A1 Nov. 12, 2015

(30) Foreign Application Priority Data

May 9, 2014 (JP) ................................. 2014-097564

(51) Int. Cl.
H04N 5/222 (2006.01)
G06F 3/14 (2006.01)
H04N 5/232 (2006.01)
H04N 5/265 (2006.01)
H04N 5/262 (2006.01)
H04N 5/225 (2006.01)

(52) U.S. Cl.
CPC ......... *H04N 5/23293* (2013.01); *H04N 5/2251* (2013.01); *H04N 5/23216* (2013.01); *H04N 5/265* (2013.01); *H04N 5/2628* (2013.01)

(58) Field of Classification Search
CPC ............... H04N 15/23293; H04N 5/2628; H04N 5/265; H04N 5/23216; G06F 2200/1614; G06F 1/1649; H04M 1/0233
USPC ................ 348/333.01–333.13; 715/863, 864
See application file for complete search history.

(56) References Cited

U.S. PATENT DOCUMENTS

| 7,460,893 | B2* | 12/2008 | Aarras | G06F 1/1618 345/169 |
|---|---|---|---|---|
| 8,248,504 | B2* | 8/2012 | Nozawa | H04N 5/23293 345/659 |
| 8,848,100 | B2* | 9/2014 | Kuwahara | A63F 13/10 348/333.06 |
| 2004/0192398 | A1* | 9/2004 | Zhu | H04M 1/0227 455/566 |
| 2006/0238496 | A1* | 10/2006 | Jin | G06F 1/1616 345/156 |
| 2009/0022426 | A1* | 1/2009 | Yamazaki | G01C 21/3673 382/296 |
| 2012/0069234 | A1* | 3/2012 | Yasuda | G06F 3/0346 348/333.06 |

(Continued)

FOREIGN PATENT DOCUMENTS

JP 3505088 3/2004

*Primary Examiner* — Chia-Wei A Chen
(74) *Attorney, Agent, or Firm* — Fitzpatrick, Cella, Harper & Scinto

(57) ABSTRACT

An image pickup apparatus in which drawing information can be input from a touch panel by a photographer and a display unit is rotatable between a reverse display state and a normal display state. When the display unit is in the reverse display state image data can easily be obtained which reflects drawing information intended by the photographer without changing a flipping status of the taken image. On the display unit, the drawing information is displayed in a manner so as to be superimposed on the taken image. Whether the display unit is in the reverse display state or the normal display state is detected, and in response to switching between the reverse display state and the normal display state, the drawing information displayed on the display unit is flipped. Depending on the type of the drawing information, the drawing information is vertically flipped, or the drawing information is vertically flipped and also horizontally flipped.

11 Claims, 8 Drawing Sheets

(56) References Cited

U.S. PATENT DOCUMENTS

2012/0081576 A1* 4/2012 Seo .................. G03B 17/02
348/231.6
2012/0311438 A1* 12/2012 Cranfill ............. G06F 17/30011
715/256
2013/0050556 A1* 2/2013 Lee .................... H04N 5/23222
348/333.06
2013/0074383 A1* 3/2013 Hagemann ............ G09F 13/005
40/447
2013/0120635 A1* 5/2013 Kim .................... H04N 5/23219
348/333.06
2015/0100876 A1* 4/2015 Neugebauer .......... G06F 17/241
715/233
2016/0057358 A1* 2/2016 Yamamoto ........... H04N 5/2252
348/333.06

* cited by examiner

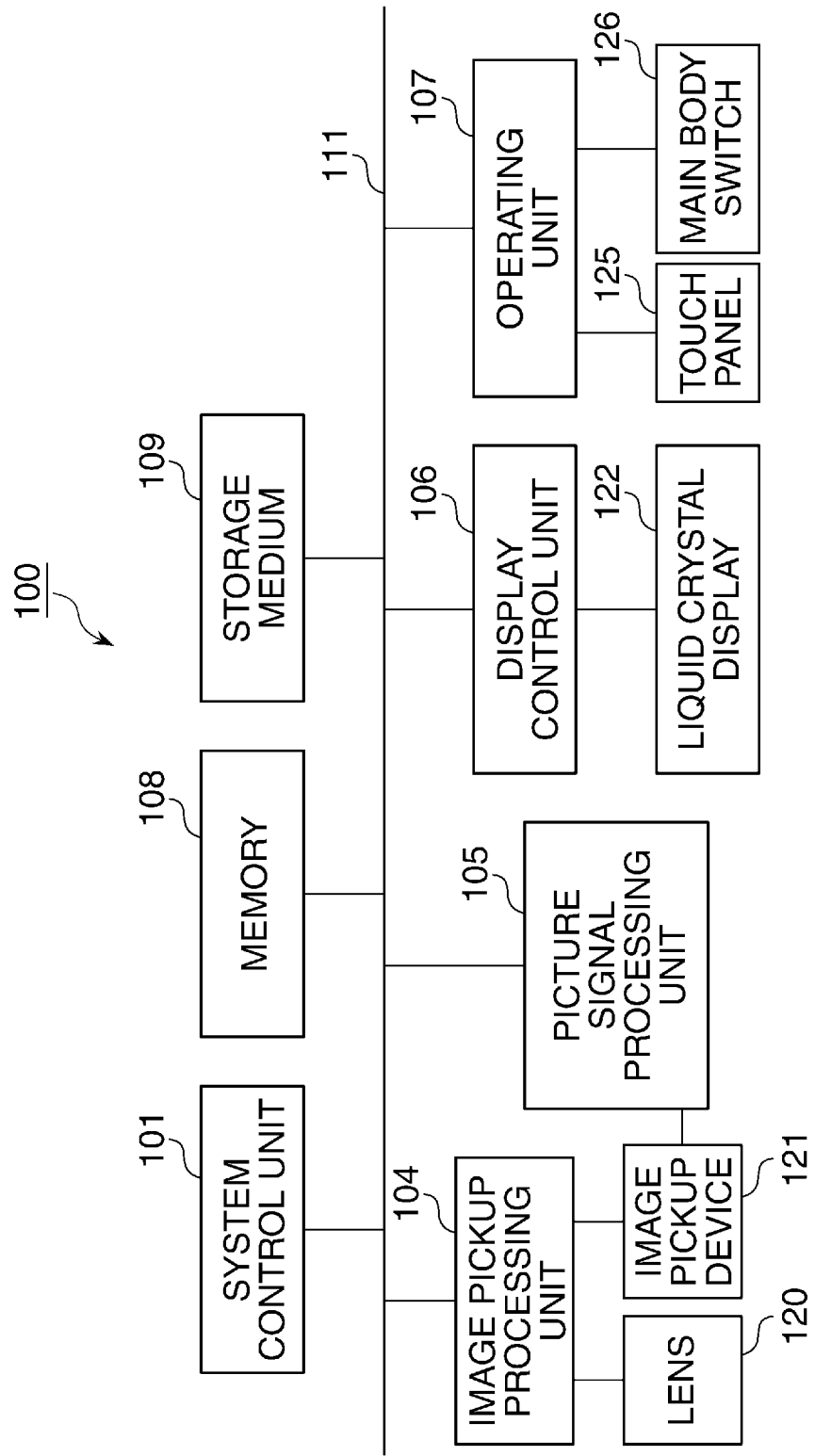

IMAGE PICKUP APPARATUS HAVING TOUCH PANEL, IMAGE PROCESSING METHOD, AND STORAGE MEDIUM

BACKGROUND OF THE INVENTION

1. Field of the Invention

The present invention relates to an image pickup apparatus having a touch panel, an image processing method for the image pickup apparatus, and a storage medium storing a program for implementing the image processing method.

2. Description of the Related Art

In recent years, as user interfaces for performing operations on image pickup apparatuses (video equipment) such as digital video cameras, touch panels have been used which enable a user to perform an operation on an image pickup apparatus by touching a screen of a liquid crystal display or the like with a finger, a special pen, or the like (hereafter referred to as "a finger or the like"). A control means such as a microcomputer incorporated in an image pickup apparatus detects a position on a touch panel touched by a user with a finger or the like, identifies a switch (icon) displayed at the detected position, and performs a process or an operation associated with the identified switch (icon). Some touch panels of image pickup apparatuses have not only a switch-replacement function but also a drawing input (hereafter referred to as "hand-drawing input") function of, when a linear drawing, characters, etc. are drawn on the touch panels with a finger or the like, superimposing the drawn linear drawing, characters, etc. on a taken image (taken picture).

Some image pickup apparatuses such as digital video cameras are equipped with a rotatable liquid crystal display having a touch panel and have a shooting mode which allows shooting in a state where a display screen of the liquid crystal display faces toward a taking lens (self shoot). FIGS. 7A to 7c are views showing the relationship among a camera main body 70, position of a liquid crystal display 71, and displayed taken image (displayed picture) in a conventional digital video camera capable of self shoot.

FIG. 7A shows a normal display state where a display screen of the liquid crystal display 71 faces toward a rear of the camera main body 70. Four corners of the liquid crystal display 71 in the state shown in FIG. 7A are designated by T-L, B-L, T-R, and B-R, respectively. FIG. 7B shows a reverse display state immediately after the display screen of the liquid crystal display 71 is turned to face toward a front (lens 73 side) of the camera main body 70. When the liquid crystal display 71 is rotated 180 degrees about an A-axis shown in FIG. 7A so that the display screen (touch panel 72) of the liquid crystal display 71 can face toward the front, the taken image is vertically flipped. Thus, in the reverse display state, the taken image is flipped vertically and displayed on the display screen as shown in FIG. 7C.

FIG. 8A shows a state where in the state in FIG. 7C, hand-drawing input is done on the touch panel 72 which the liquid crystal display 71 is equipped with. FIG. 8B shows an exemplary display when the liquid crystal display 71 is brought back to the normal display state after hand-drawing input in FIG. 8A. In FIG. 8B, the displayed image is flipped from the display state shown in FIG. 8A, but a linear drawing input by hand-drawing input is not flipped, and hence hand-drawing input is not shown as intended.

To prevent this problem, there has been proposed a method which prohibits hand-drawing input from a touch panel when a liquid crystal display is in the reverse display state. Also, there has been proposed a technique to, when a liquid crystal display is in the reverse display state, vary a flipping status of a taken image according to whether or not hand-drawing input from a touch panel is to be done (see Japanese Patent Publication No. 3505088).

However, as with the conventional art described above, when a liquid crystal display is in the reverse display state, if a flipping status of a taken image is varied depending on whether or not hand-drawing input from a touch panel is to be done, a problem arises because it makes framing during shooting difficult.

SUMMARY OF THE INVENTION

The present invention provides an image pickup apparatus and an image processing method which are capable of, when drawing information is input from a touch panel by a photographer when a display unit is in a reverse displays state, easily obtaining image data which reflects drawing information intended by the photographer without changing a flipping status of the taken image.

Accordingly, the present invention provides an image pickup apparatus comprising a touch panel configured to allow input of drawing information, a display unit configured to display a taken image and superimpose the drawing information, which is input through the touch panel, on the taken image, a rotating unit configured to rotate the display unit between a reverse display state and a normal display state, and a flipping unit configured to flip the drawing information displayed on the display unit in response to switching a state of the display unit between the reverse display state and the normal display state by the rotating unit, wherein according to a type of the drawing information, the flipping unit carries out a first flipping process in which the drawing information is vertically flipped or a second flipping process in which the drawing information is vertically flipped and also horizontally flipped.

According to the present invention, when a photographer inputs drawing information from the touch panel when the display unit is in the reverse display state, the first flipping process in which the drawing information is vertically flipped or the second flipping process in which the drawing information is vertically flipped and also horizontally flipped is carried out according to a type of the drawing information. As a result, image data which reflects the drawing information intended by the photographer is easily obtained without changing a flipping status of a taken image.

Further features of the present invention will become apparent from the following description of exemplary embodiments (with reference to the attached drawings).

BRIEF DESCRIPTION OF THE DRAWINGS

FIG. 1 is a block diagram schematically showing an arrangement of a digital video camera which is an exemplary image pickup apparatus according to embodiments of the present invention.

DESCRIPTION OF THE EMBODIMENTS

Figure 2A:
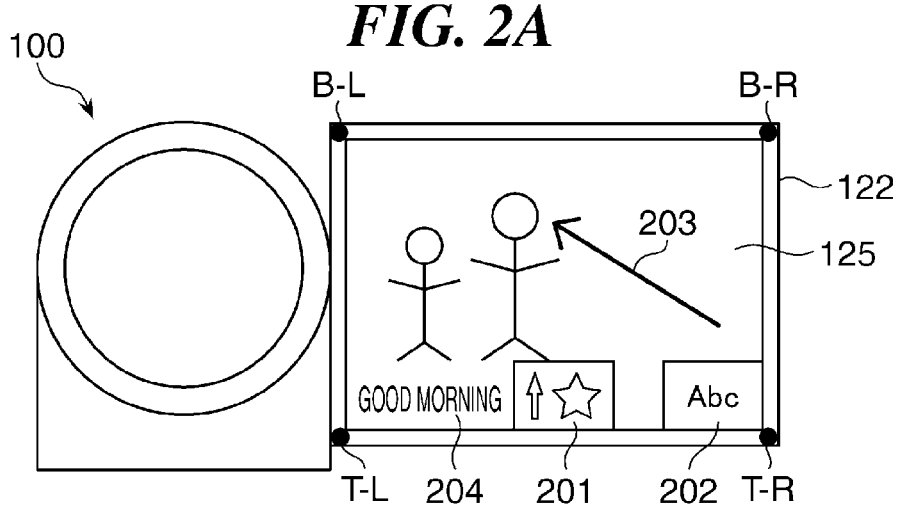
FIGS. 2A to 2C are views showing exemplary displays on a liquid crystal display of the digital video camera in FIG. 1 according to a first embodiment.

The present invention will now be described in detail with reference to the drawings showing embodiments thereof. Here, a digital video camera is taken as an example of an image pickup apparatus according to the embodiments of the present invention.

FIG. 1 is a block diagram schematically showing an arrangement of the digital video camera 100 which is an exemplary image pickup apparatus according to the embodiments of the present invention. The digital video camera 100 has a system control unit 101, an image pickup processing unit 104, a picture signal processing unit 105, a display control unit 106, an operating unit 107, a memory 108, and a storage medium 109, and they are connected to one another via an internal bus 111.

The system control unit 101 has a CPU and a memory such as ROM and RAM, and controls operation of components of the digital video camera 100 according to control programs stored in the memory. The image pickup processing unit 104 controls a lens 120 to perform a focusing operation and also controls an image pickup device 121 to perform an image pickup operation. The image pickup device 121 is an image sensor such as a CCD sensor or a CMOS sensor. The picture signal processing unit 105 processes output signals from the image pickup device 121.

Figure 7A:
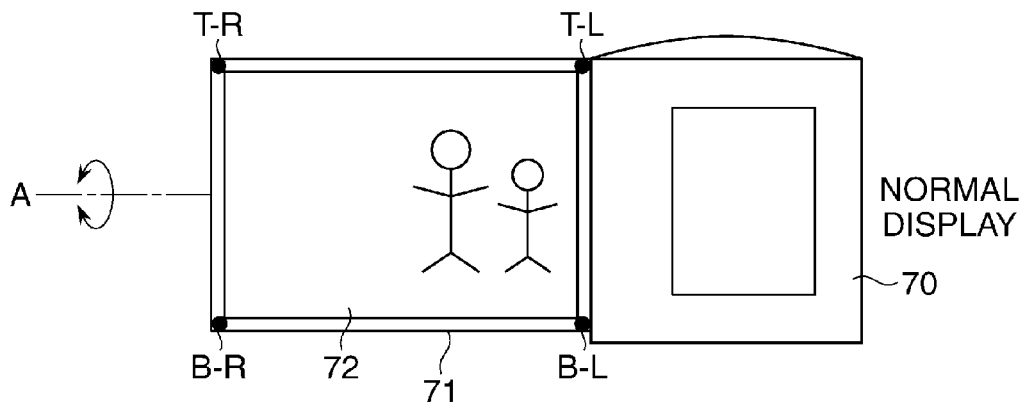
FIGS. 7A to 7c are views showing the relationship among a camera main body, position of a liquid crystal display, and displayed image in a conventional digital video camera.
Figure 7B:
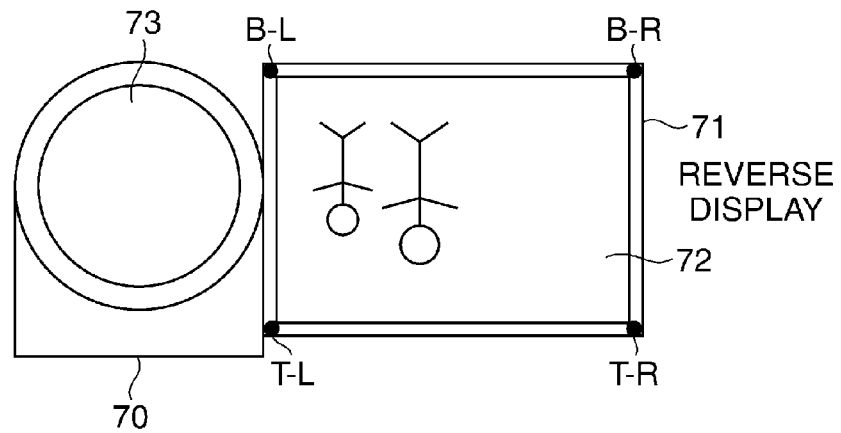
Figure 7C:
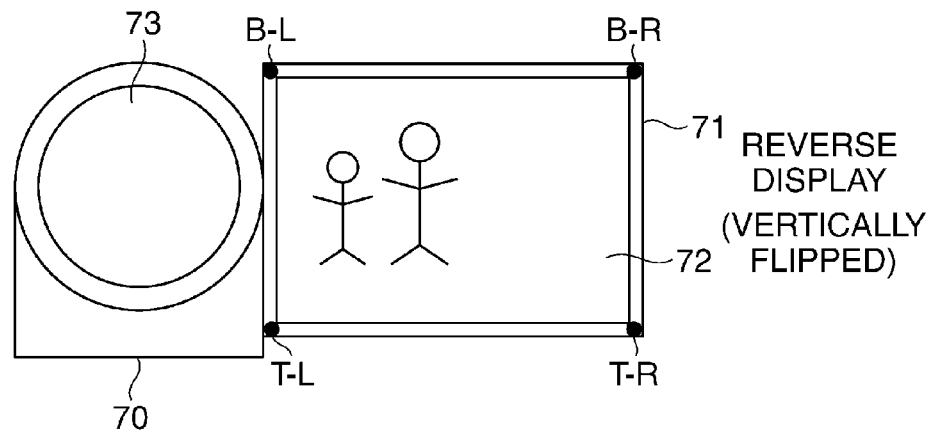

A liquid crystal display 122, which is a display unit on which a taken picture is displayed, is connected to the display control unit 106. With the digital video camera 100, it is possible to perform shooting while visually identifying a picture displayed on the liquid crystal display 122. Similarly to the liquid crystal display 71 described with reference to FIGS. 7A to 7C, the liquid crystal display 122 is configured to be rotatable between a reverse display state and a normal display state. The display control unit 106 controls display on the liquid crystal display 122 and also detects whether or not the liquid crystal display 122 is in the reverse display state or the normal display state and notifies the system control unit 101 of the detection result. It should be noted that definitions of the reverse display state and the normal display state conform to the description referring to FIGS. 7A to 7C.

Upon receiving notification that the liquid crystal display 122 is in the reverse display state from the display control unit 106, the system control unit 101 instructs the display control unit 106 to vertically flip a picture output from the picture signal processing unit 105. As a result, a taken picture correctly oriented in a vertical direction is always displayed even when the liquid crystal display 122 is switched from the reverse display state to the normal display state and vice versa.

The operating unit 107 has a touch panel 125, to which drawing information (detailed description thereof will be given later) and a main body switch 126 and outputs information on their operations to the system control unit 101. The touch panel 125 is mounted on a display screen of the touch panel 122. It should be noted that as a contact sensing system for the touch panel 125, any of various systems such as a resistive system, a capacitive system, a surface acoustic wave system, an infrared system, an electromagnetic induction system, an image recognition system, and a photosensor system may be used.

Picture data on taken pictures subjected to signal processing by the picture signal processing unit 105, picture data read out from the recoding medium 109 so as to be reproduced and displayed on the liquid crystal display 122, and so on are temporarily stored in the memory 108. Picture data on taken pictures is stored in the storage medium 109.

The system control unit 101 detects various operations performed on the touch panel 125, for example, touch-down, touch-on, move, touch-up, touch-off, and flick. It should be noted that touch-down is an operation of a finger or the like touching the touch panel 125, touch-on is a state of a finger or the like being kept in contact with the touch panel 125, and move is an operation of a finger or the like moving on the touch panel 125 while being kept in contact with the touch panel 125. Touch-up is an operation of releasing a finger or the like having been in contact with the touch panel 125 from the touch panel 125, and touch-off is a state where nothing touches the touch panel 125. Flick is an operation in which sequential movements from touch-down to touch-up via a predetermined move are quickly made, like a finger or the like flicking the touch panel 125.

Information on such operations on the touch panel 125, positional coordinates at which a finger or the like touches the touch panel 125 is supplied to the system control unit 101 through the internal bus 111. Based on the supplied information, the system control unit 101 determines what type of operation has been performed on the touch panel 125. When hand-drawing input which is input of drawing information to the touch panel 125 with a finger or the like is enabled, the system control unit 101 sends a path taken coordinates of touch-on and move on the touch panel 125 as drawing information to the picture signal processing unit 105. An operating mode in which hand-drawing input to the touch panel 125 is enabled will hereafter be referred to as "the hand-drawing input mode". The picture signal processing unit 105 superimposes a path taken by coordinates of operations with a finger or the like on the touch panel 125 on a taken picture obtained from the image pickup processing unit 104. This implements a function of hand-drawing input to a taken picture. Picture data comprised of the taken picture thus generated and the drawing information input by hand-drawing is stored in the storage medium 109.

In an arrangement according to a first embodiment, selection between a hand-drawing input mode coinciding with a subject position (hereafter referred to as "the first input mode") and a hand-drawing input mode in which a sequence in a horizontal direction of the touch panel has a meaning (hereafter referred to as "the second input mode") is allowed through operation of the operating unit 107 when hand-drawing input is to be done in the reverse display mode. Drawing information input from the touch panel 125 in the first input mode when the liquid crystal display 122 is in the reverse display state is subjected to a first flipping process in which the drawing information is vertically flipped when the liquid crystal display 122 is brought into the normal display state. Drawing information input from the touch panel 125 in the second input mode when the liquid crystal display 122 is in the reverse display state is subjected to a second flipping process in which the drawing information is vertically flipped and also horizontally flipped when the liquid crystal display 122 is brought into the normal display state.

FIG. 2A is a view (frontal view) showing an exemplary display on the liquid crystal display 122 according to the first embodiment when the liquid crystal display 122 is in the reverse display state and the touch panel 125 is placed in the hand-drawing input mode. Hand-drawing input is allowed to be enabled and disabled through operation of the operating unit 107. Four corners B-R, T-R, B-L, and T-L of the liquid crystal display 122 in FIG. 2A conform to the description referring to FIGS. 7A to 7C, and the same goes for FIG. 2B and FIG. 5 referred to later.

The system control unit 101 displays a first button (icon) 201 and a second button (icon) 202 when the liquid crystal display 122 is in the reverse display state and the touch panel 125 is in the hand-drawing input mode. The first button 201 is for shifting into the first input mode. The second button 202 is for shifting into the second input mode.

Referring to FIG. 2A, a hand-drawn image 203, which is a path taken by coordinates of touch-on on a point on the touch panel 125, move, and touch-off in this order after touch-on on the first button 201 is shown. In response to input of the hand-drawn image 203, the system control unit 101 instructs the picture signal processing unit 105 to superimpose the hand-drawn image 203 on a taken picture obtained from the image pickup processing unit 104.

Here, the taken picture displayed on the liquid crystal display 122 in the reverse display state is a picture obtained by vertically flipping a taken picture stored in the storage medium 109. On the other hand, the hand-drawn image 203 input to the touch panel 125 when the liquid crystal display 122 is in the reverse display state is identified by present coordinates on the liquid crystal display 122. Thus, according to the conventional art described with reference to FIGS. 8A and 8B, when the liquid crystal display 122 is brought back to the normal display state immediately after the hand-drawn image 203 is input, the taken picture is vertically flipped to be correctly displayed, but the hand-drawn image 203 is displayed in a vertically flipping status since it is displayed using the identified coordinates.

Accordingly, in the present embodiment, when the liquid crystal display 122 is shifted from the reverse display state to the normal display state immediately after the hand-drawn image 203 is input, the first flipping process is carried out in which coordinates of image data on the hand-drawn image 203 are vertically flipped using a center in the vertical direction of the touch panel 125 as an axis. Also, the image data on the hand-drawn image 203 is stored, in the storage medium 109, as hand-drawn data obtained by vertically flipping coordinates of the hand-drawn image 203.

Figure 2B:
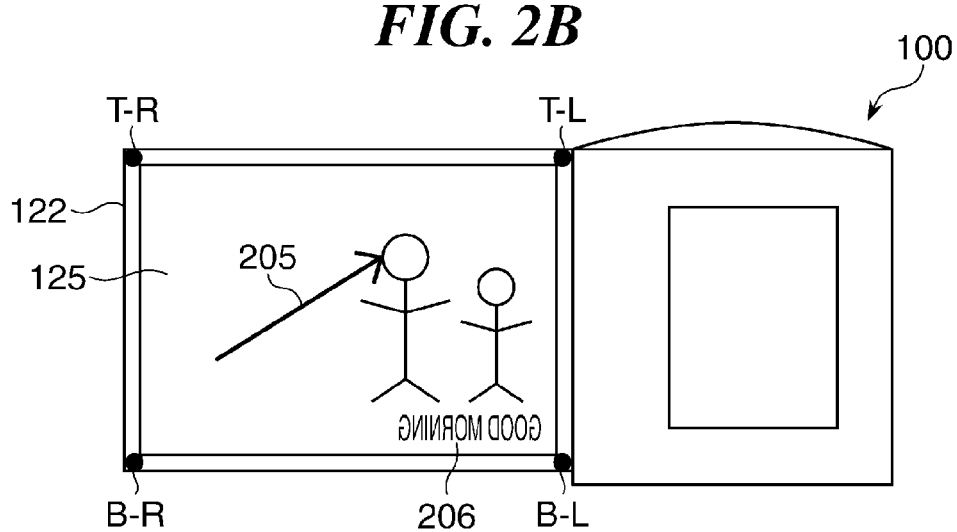
Figure 8A:
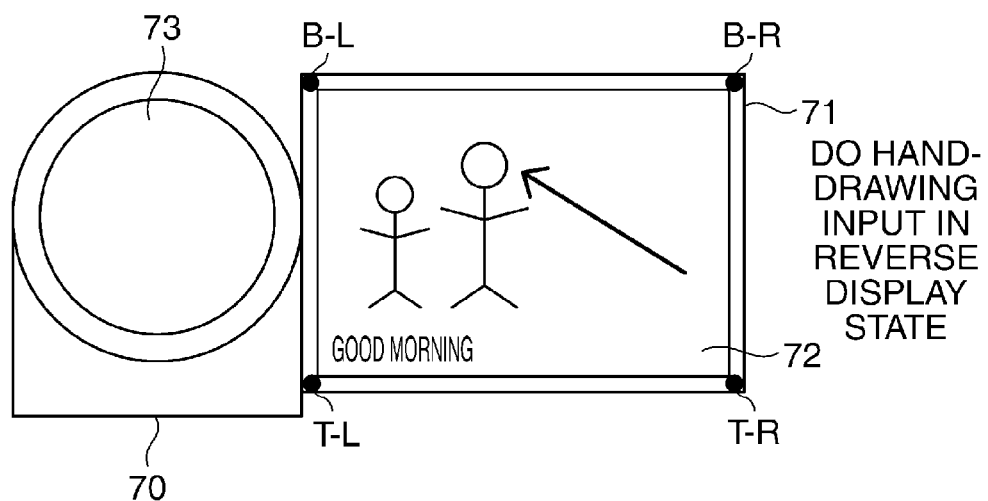
FIGS. 8A and 8B are views showing exemplary displays in a state shown in FIG. 7C and a state where the liquid crystal display has been brought back to a normal display state after hand-drawing input.
Figure 8B:
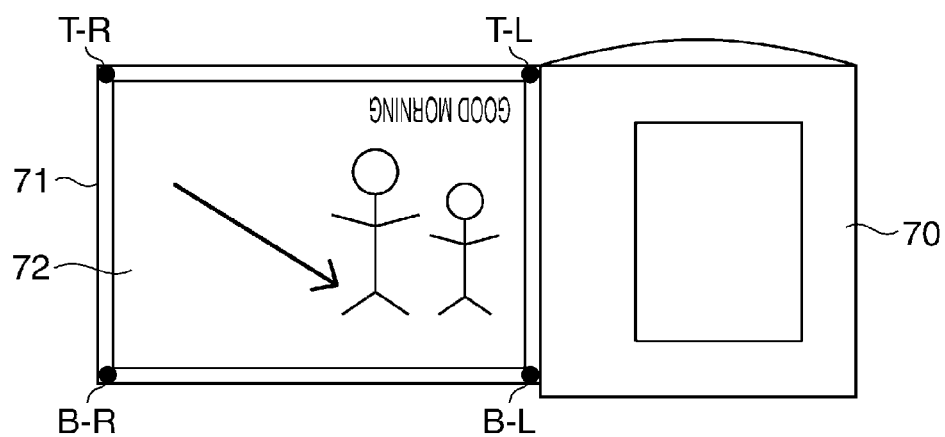

FIG. 2B is a view showing an exemplary display on the liquid crystal display 122 when the liquid crystal display 122 is shifted from the reverse display state to the normal display state immediately after the hand-drawn image 203 is input. It should be noted that FIG. 2B is also a view showing a state where picture data stored in the storage medium 109 after the hand-drawn image 203 is input as shown in FIG. 2A is displayed on the liquid crystal display 122 in the normal display state. The hand-drawn image 203 which is drawn as an arrow pointing diagonally upward toward a subject in the reverse display state in FIG. 2A is correctly displayed as a hand-drawn image 205 which is an arrow pointing diagonally upward toward the subject in the normal display state in FIG. 2B. On this occasion, the hand-drawn image 203 is an input in the first input mode, that is, the hand-drawn image 203 is an input coinciding with a subject position, and hence the hand-drawn image 205 has not been horizontally flipped. It is thus apparent that the problems of the conventional art described with reference to FIGS. 8A and 8B are solved.

Referring to FIG. 2A, a hand-drawn image 204 which is a path taken by coordinates of touch-on on a point on the touch panel 125, move, and touch-off in this order after touch-on on the second button 202. In response to input of the hand-drawn image 204, the system control unit 101 instructs the video signal processing unit 105 to superimpose the hand-drawn image 204 on a taken picture obtained from the image pickup processing unit 104.

When the liquid crystal display 122 is shifted from the reverse display state to the normal display state immediately after the hand-drawn image 204 is input, coordinates of image data on the hand-drawn image 204 are vertically flipped using a center in the vertical direction of the touch panel 125 as an axis and also horizontally flipped using a center in the vertical direction of the touch panel 125 as an axis. Also, image data on the hand-drawn image 204 is stored in the storage medium 109 as hand-drawn data obtained by vertically flipping and horizontally flipping coordinates of the hand-drawn image 204. Thus, when the liquid crystal display 122 is shifted from the reverse display state to the normal display state immediately after the hand-drawn image 204 is input, the state shifts into the state in FIG. 2C after shifting into the state in FIG. 2B.

Figure 2C:
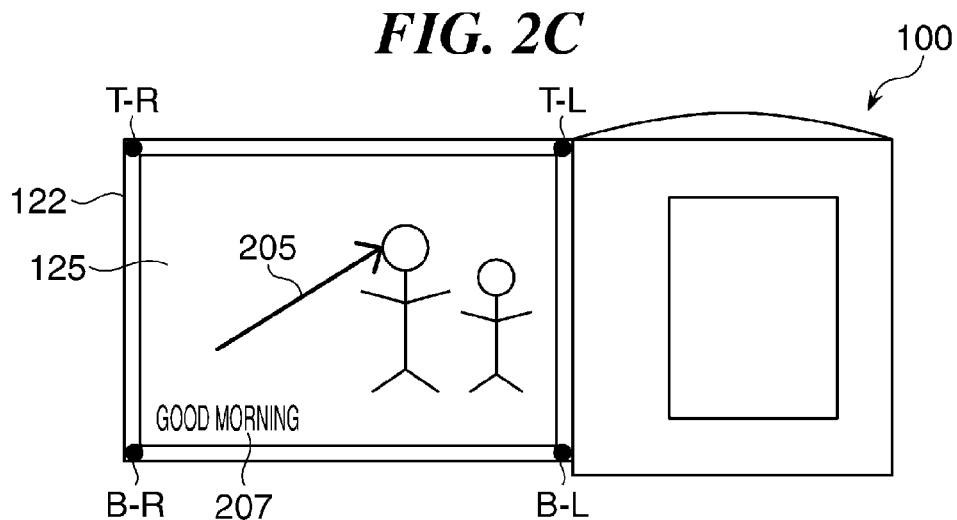

FIG. 2C is a view showing an exemplary display on the liquid crystal display 122 when the liquid crystal display 122 is shifted from the reverse display state to the normal display state immediately after the hand-drawn image 204 is input. FIG. 2C is also a view showing a state where picture data (including picture data on a taken picture and image data on the hand-drawn image 204) stored in the storage medium 109 after the hand-drawn image 204 is input as shown in FIG. 2A is displayed on the liquid crystal display 122 in the normal display state. In FIG. 2B, a hand-drawn image 206 which is the hand-drawn image 204 displayed correctly in the vertical direction but reversely in the horizontal direction, but when the state further shifts into the state in FIG. 2C, the hand-drawn image 206 is displayed as a hand-drawn image 207 which is correct in the horizontal direction as well.

As described above, according to the present embodiment, a taken picture and drawing information input from the touch panel 125 in the reverse display state are stored as picture data, which is displayed in a state for the normal display state of the liquid crystal display 122, in the storage medium 109 based on settings configured using the first button 201 and the second button 202. It should be noted that the hand-drawing input mode is brought to an end through operation of the operating unit 107.

Figure 3:
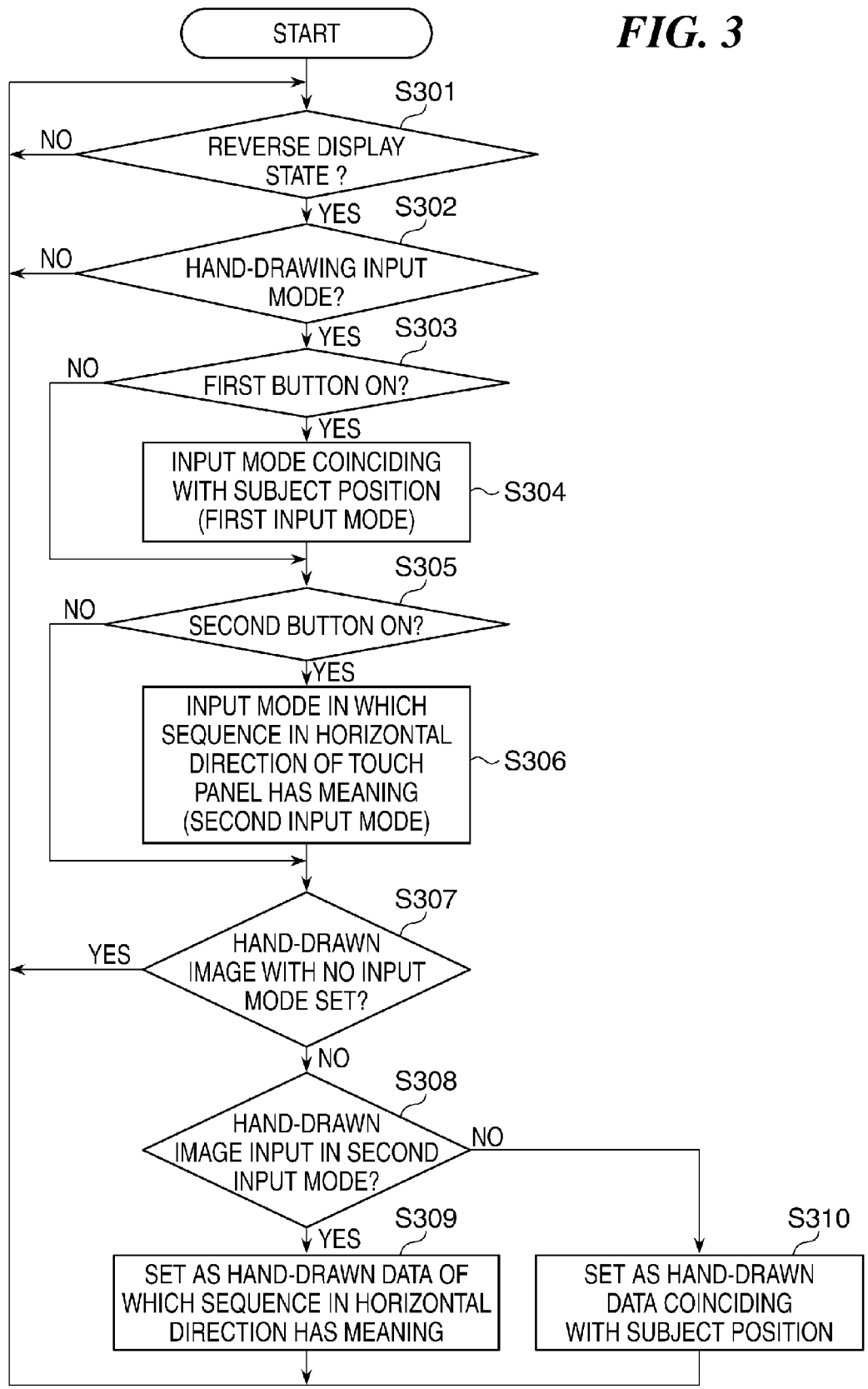
FIG. 3 is a flowchart which is executed by a system control unit so as to implement a user interface in a hand-drawing input mode according to the first embodiment of the present invention.

FIG. 3 is a flowchart which is executed by the system control unit 101 so as to implement a user interface (image processing method) in the hand-drawing input mode described with reference to FIGS. 2A to 2C. Processes in the flowchart of FIG. 3 are implemented by the CPU of the system control unit 101 expanding programs stored in the ROM into the RAM.

In step S301, the system control unit 101 determines whether or not the liquid crystal display 122 is in the normal display state or the reverse display state. When the system control unit 101 determines that the liquid crystal display 122 is in the reverse display state (YES in S301), the process proceeds to step S302, and when the liquid crystal display 122 is in the normal display state (NO in the step S301), the system control unit 101 makes the determination in the step S301 again. In the step S302, the system control unit 101 determines whether or not the touch panel 125 is placed in the hand-drawing input mode. When the system control unit 101 determines that the touch panel 125 is placed in the hand-drawing input mode (YES in S302), the process proceeds to step S303, and when the system control unit 101 determines that the touch panel 125 is not placed in the hand-drawing input mode (NO in the step S302), the process returns to the step S301.

In the step S303, the system control unit 101 determines whether or not the first button 201 has been depressed. When the system control unit 101 determines that the first button 201 has been depressed (YES in S303), the process proceeds to step S304, and when the system control unit 101 determines that the first button 201 has not been depressed (NO in the step S303), the process proceeds to step S5305. In the step S304, the system control unit 101 configures the hand-drawing input mode at the first input mode. After that, the process proceeds to the step S305.

In the step S305, the system control unit 101 determines whether or not the second button 202 has been depressed. When the system control unit 101 determines that the second button 202 has been depressed (YES in S305), the process proceeds to step S306, and when the system control unit 101 determines that the second button 202 has not been depressed (NO in the step S305), the process proceeds to step S307. In the step S306, the system control unit 101 configures the hand-drawing input mode at the second input mode. After that, the process proceeds to the step S307.

In the step S307, the system control unit 101 determines whether or not a hand-drawn image which is input drawing information is a hand-drawn image for which neither of the input modes in the steps S304 and S306 has been set. When the system control unit 101 determines that the input hand-drawn image is a hand-drawn image for which neither of the input modes has been set (YES in S307), the process returns to the step S301, and when the system control unit 101 determines that the input hand-drawn image is a hand-drawn image for which either of the input modes has been set (NO in the step S307), the process proceeds to step S308. It should be noted that as a result of this, hand-drawn input data input by hand-drawing without depressing the first button 201 or the second button 202 is not subjected to the process described with reference to FIGS. 2A to 2C but is subjected to the same process as the conventional one described with reference to FIGS. 8A and 8B.

In the step S308, the system control unit 101 determines whether or not the input hand-drawn image was input in the second input mode. Namely, the system control unit 101 determines whether the input hand-drawn image was input in the input mode set in the step S304 or input in the input mode set in the step S306. When the system control unit 101 determines that the input hand-drawn image was input in the second input mode (YES in S308), the process proceeds to step S309, and when the system control unit 101 determines that the input hand-drawn image was not input in the second input mode (NO in S308), the process proceeds to step S310.

In the step S309, the system control unit 101 sets image data on the input hand-drawn image as hand-drawn data of which a sequence in the horizontal direction has a meaning. In the step S310, the system control unit 101 sets image data on the input hand-drawn image as hand-drawn data coinciding with a subject position. For example, in the step S309, a flag indicating that the hand-drawn data is data of which a sequence in the horizontal direction has a meaning is added to the hand-drawn data, and in the step S310, a flag indicating that the hand-drawn data is data coinciding with a subject position is added to the hand-drawn data. After the steps S309 and S310, the process returns to the step S301.

Figure 4:
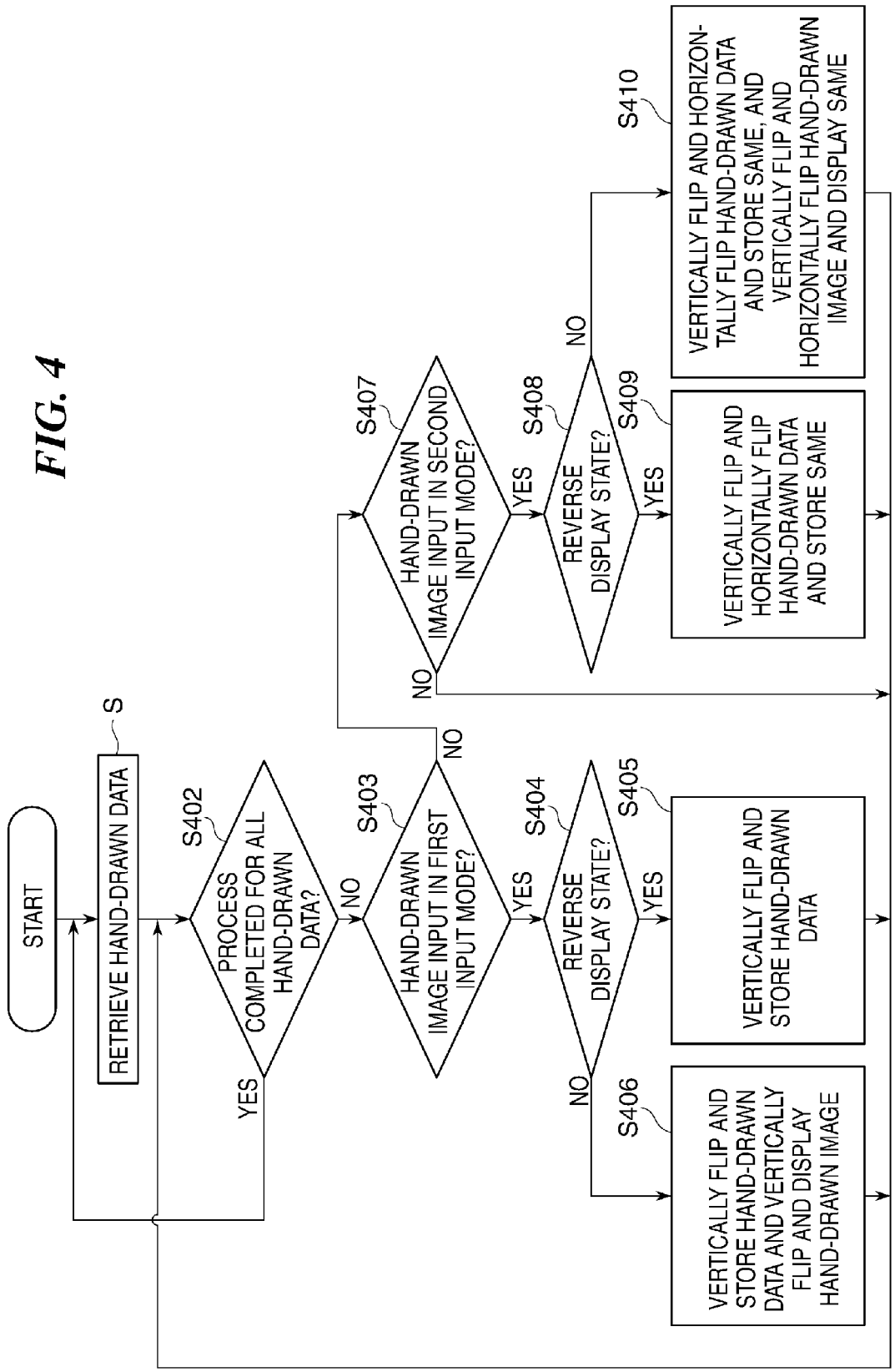
FIG. 4 is a flowchart of image processing in a hand-drawing input mode according to the first embodiment.

FIG. 4 is a flowchart of image processing in the hand-drawing input mode described with reference to FIGS. 2A to 2C. Processes in the flowchart of FIG. 4 are implemented by the CPU of the system control unit 101 expanding programs stored in the ROM into the RAM and the system control unit 101 controlling operation of various component elements of the digital video camera 100.

In step S401, the system control unit 101 retrieves hand-drawn data in a taken picture. Then, in step S402, the system control unit 101 determines whether or not processes in steps S403 to S410, to be described later, have been completed for all the hand-drawn data. When the system control unit 101 determines that the processes have been completed (YES in S402), the process returns to the step S401, and when the system control unit 101 determines that the processes have not been completed (NO in S402), the process proceeds to the step S403.

In the step S403, based on, for example, the flags mentioned in the above description of the steps S309 and S310, the system control unit 101 determines whether or not the retrieved hand-drawn data is data on a hand-drawn image input in the first input mode (data on a hand-drawn image coinciding with a subject position). When the system control unit 101 determines that the retrieved hand-drawn data is data on a hand-drawn image input in the first input mode (YES in S403), the process proceeds to the step S404, and when the system control unit 101 determines that the retrieved hand-drawn data is not data on a hand-drawn image input in the first input mode (NO in S403), the process proceeds to the step S407.

In the step S404, the system control unit 101 determines whether or not the liquid crystal display 122 is in the reverse display state. When the system control unit 101 determines that the liquid crystal display 122 is in the reverse display state (YES in S404), the process proceeds to the step S405, and when the system control unit 101 determines that the liquid crystal display 122 is in the normal display state, not in the reverse display state (NO in S404), the process proceeds to the step S406.

In the step S405, the system control unit 101 vertically flips and stores the hand-drawn data in the storage medium 109. At this time, the liquid crystal display 122 is still in the reverse display state as it was when a hand-drawn image related to the hand-drawn data was input, and hence there is no change in display on the liquid crystal display 122, and for example, the liquid crystal display 122 is in the display state shown in FIG. 2A. In the step S406, the system control unit 101 vertically flips and stores the hand-drawn data in the storage medium 109 and vertically flips and displays the hand-drawn image related to the hand-drawn data on the liquid crystal display 122. This brings the liquid crystal display 122 to, for example, the display state shown in FIG. 2B. After the steps S405 and S406, the process returns to the step S402.

In the step S407, based on, for example, the flags mentioned in the above description of the steps S309 and S310, the system control unit 101 determines whether or not the retrieved hand-drawn data is data on a hand-drawn image input in the second input mode. When the system control unit 101 determines that the retrieved hand-drawn data is data on a hand-drawn image input in the second input mode (YES in S407), the process proceeds to the step S408, and when the system control unit 101 determines that the retrieved hand-drawn data is not data on a hand-drawn image input in the second input mode (NO in S407), the process returns to the step S402.

In the step S408, the system control unit 101 determines whether or not the liquid crystal display 122 is in the reverse display state. When the system control unit 101 determines that the liquid crystal display 122 is in the reverse display state (YES in S408), the process proceeds to the step S409, and when the system control unit 101 determines that the liquid crystal display 122 is in the normal display state, not in the reverse display state (NO in S408), the process proceeds to the step S410.

In the step S409, the system control unit 101 vertically flips and horizontally flips the hand-drawn data and stores the same in the storage medium 109. At this time, the liquid crystal display 122 is still in the reverse display as it was when a hand-drawn image related to the hand-drawn data was input, there is no change in the display on the liquid crystal display 122, and for example, the liquid crystal display 122 is in the display state shown in FIG. 2A. In the step S410, the system control unit 101 vertically flips and horizontally flips the hand-drawn data and stores the same in the storage medium 109. Also, in the step S410, the system control unit 101 vertically flips and horizontally flips the hand-drawn image related to the hand-drawn data and displays the same on the liquid crystal display 122, bringing the liquid crystal display 122 to, for example, the display state shown in FIG. 2C. After the steps S409 and S410, the process returns to the step S402.

As described above, in the present embodiment, when hand-drawing input is to be done from the touch panel 125 in the reverse display state, selection between the first input mode and the second input mode is allowed through operation. As a result, drawing information input by a user in the reverse display state is displayed and stored as a picture which reflects an intention of the user even in the normal display state.

It should be noted that in the embodiment described above, drawing information in the second input mode is horizontally flipped about a central axis in the horizontal direction of the touch panel 125 (see FIGS. 2A and 2C). This is not limitative, but drawing information in the second input mode may be horizontally flipped about a central position in a horizontal direction of a minimum area including a hand-drawn image in the second input mode, and this obtains a picture further coinciding with a subject position.

In a second embodiment, it is assumed that drawing information input to a specific area (first specific area) of the touch panel 125 (the liquid crystal display 122) in the reverse display state is drawing information input in the second input mode. It is also assumed that drawing information input to an area (second specific area) different from the above specific area is drawing information input in the first mode.

Figure 5:
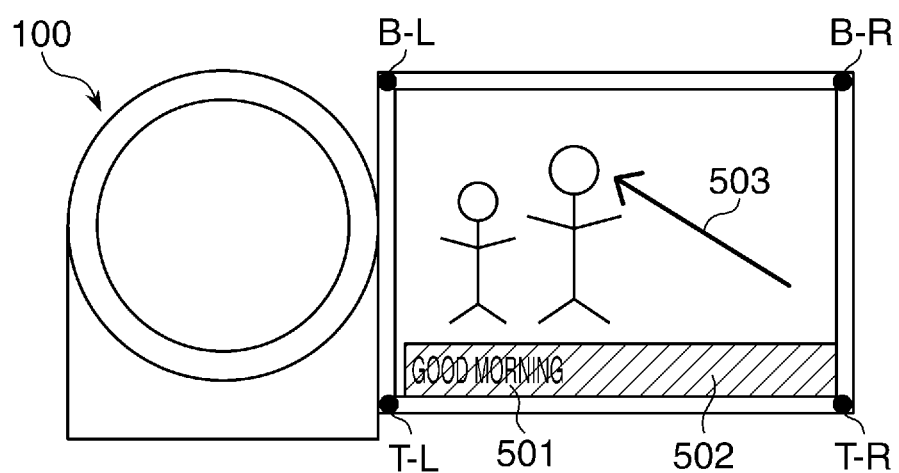
FIG. 5 is a view showing an exemplary display on the liquid crystal display of the digital video camera in FIG. 1 according to a second embodiment of the present invention.

FIG. 5 is a view (frontal view) showing an exemplary display according to the second embodiment on the liquid crystal display 122 when the digital video camera 100 is in the reverse display state and placed in the hand-drawing input mode. When the digital video camera 100 is in the reverse displays state and placed in the hand-drawing input mode, display is controlled such that a specific area 502 (first specific area) is clearly specified in a lower part of the display screen of the touch panel 125. It should be noted that the specific area 502 is, for example, displayed in a lower part of a display screen as a default and allowed to be moved within the display screen through operation of the operating unit 107 and is allowed to be designed such that its area (lateral and longitudinal lengths) is changeable.

In FIG. 5, a hand-drawn image 501 which is a path taken by coordinates of touch-on and move on the touch panel 125 is drawn as drawing information, and this hand-drawn image 501 is included in the specific area 502. In response to input of the hand-drawn image 501, the system control unit 101 instructs the picture signal processing unit 105 to superimpose the hand-drawn image 501 on a taken picture obtained from the image pickup processing unit 104. Image data on the hand-drawn image 501 is stored in the storage medium 109 as data obtained by vertically flipping the coordinates of the hand-drawn image 501 using a center in the vertical direction of the touch panel 125 as an axis and horizontally flipping the coordinates of the hand-drawn image 501 using a center in the horizontal direction of the touch panel 125 as an axis. It should be noted that even when a large part of the hand-drawn image 501 is included in the specific area 502, and only a small part of the hand-drawn image 501 lies outside the specific area 502, it may be arranged such that the same process as the process described above is carried out.

On the other hand, in FIG. 5, a hand-drawn image 503 which is a path taken by coordinates of touch-on and move on the touch panel 125 is also drawn as drawing information, but this hand-drawn image 503 is not included in the specific area 502. Thus, image data on the hand-drawn image 503 is stored in the storage medium 109 as data obtained by vertically flipping the coordinates of the hand-drawn image 503 using a center in the vertical direction of the touch panel 125 as an axis. It should be noted that even when a large part of the hand-drawn image 503 is not included in the specific area 502, and only a small part of the hand-drawn image 503 lies inside the specific area 502, it may be arranged such that the same process as the process described above is carried out.

Therefore, when the liquid crystal display 122 in the reverse display state in FIG. 5 is brought to the normal display state, the liquid crystal display 122 comes into the display state shown in FIG. 2C. Also, when a taken picture and a hand-drawn image (drawing information) which are in the display state in FIG. 5 are stored in the storage medium 109, and after that, picture data is read out and displayed on the liquid crystal display 122 which is in the normal display state, the liquid crystal display 122 comes into the display state shown in FIG. 2C.

Figure 6:
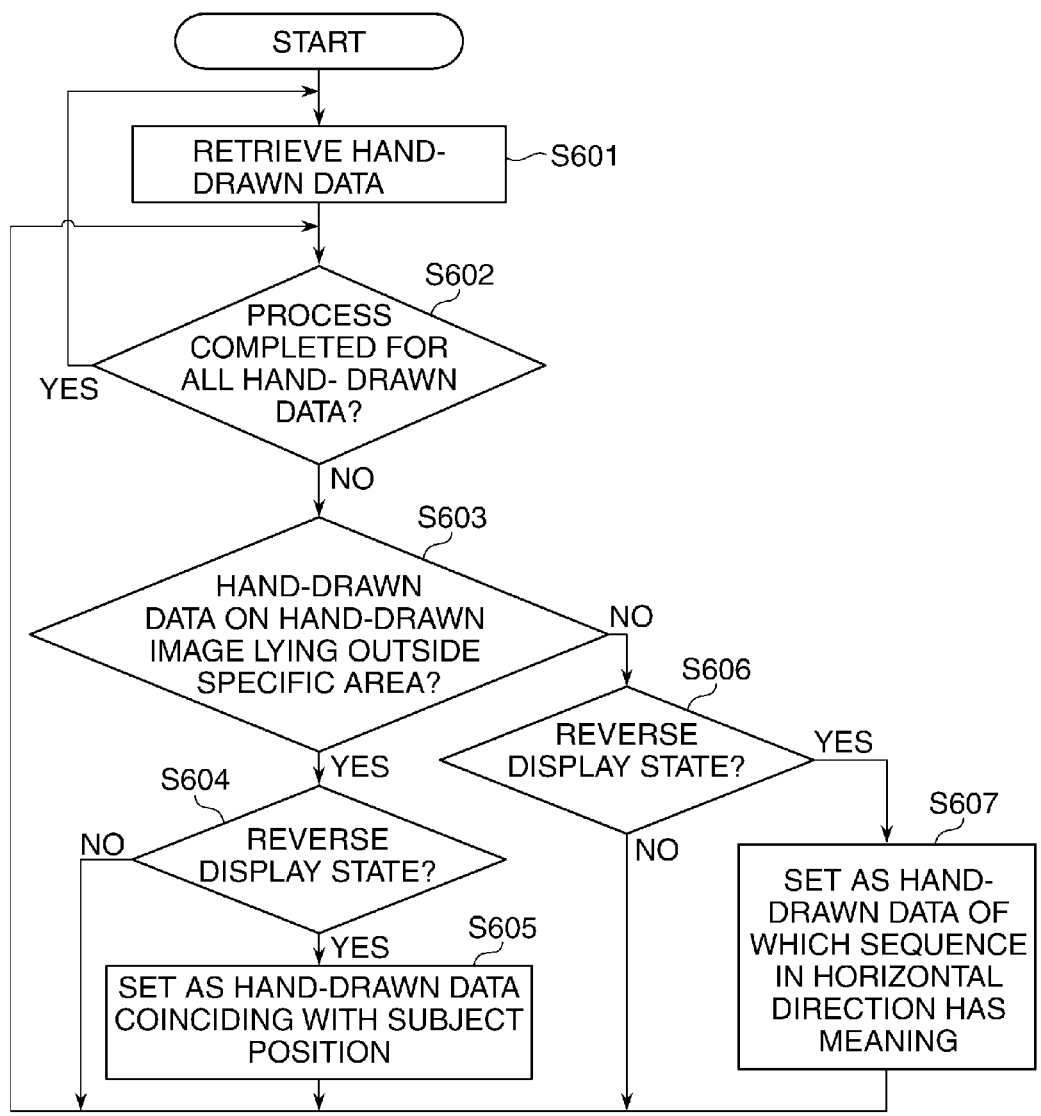
FIG. 6 is a flowchart of data processing in a hand-drawing input mode according to the second embodiment.

FIG. 6 is a flowchart of data processing in the hand-drawing input mode described with reference to FIG. 5. Processes in the flowchart of FIG. 6 are implemented by the CPU of the system control unit 101 expanding programs stored in the ROM into the RAM.

Processes in steps S601 and S602 are the same as those in the steps S401 and S402 described with reference to FIG. 4, and hence description thereof is omitted here. In step S603, the system control unit 101 determines whether or not the hand-drawn data is data on a hand-drawn image drawn outside the specific area 502 (second specific area). When the system control unit 101 determines that the hand-drawn data is data on a hand-drawn image drawn outside the specific area 502 (YES in S603), the process proceeds to step S604, and when the system control unit 101 determines that the hand-drawn data is data on a hand-drawn image drawn inside the specific area 502 (NO in S603), the process proceeds to step S606.

In the step S604, the system control unit 101 determines whether or not the liquid crystal display 122 is in the reverse display state. When the system control unit 101 determines that the liquid crystal display 122 is in the reverse display state (YES in S604), the process proceeds to step S605, and when the system control unit 101 determines that the liquid crystal display 122 is in the normal display state, not in the reverse display state (NO in S604), the process returns to the step S602. In the step S605, the system control unit 101 sets image data on the hand-drawn data, which was an object of the determination in the step S603, as hand-drawn data on the hand-drawn image coinciding with a subject position (hand-drawn data input in the first input mode). After the step S605, the process returns to the step S602.

In the step S606, the system control unit 101 determines whether or not the liquid crystal display 122 is in the reverse display state. When the system control unit 101 determines that the liquid crystal display 122 is in the reverse display state (YES in S606), the process proceeds to step S607, and when the system control unit 101 determines that the liquid crystal display 122 is in the normal display state, not in the reverse display state (NO in S606), the process returns to the step S602. In the step S607, the system control unit 101 sets image data on the hand-drawn data, which was an object of the determination in the step S603, as hand-drawn data of which a sequence in the horizontal direction of the touch panel has a meaning (hand-drawn data input in the second input mode). After the step S607, the process returns to the step S602.

As described above, similarly to the first embodiment, in the second embodiment as well, drawing information input by a user in the reverse display state is allowed to be displayed and stored as a picture which reflects an intention of the user even in the normal display state. In this case, as compared to the first embodiment, touch-on on the first button 201 ad the second button 202 may be dispensed with.

It should be noted that although in FIG. 5, the specific area 502 is indicated by diagonal lines on the liquid crystal display 122 so that a user can easily recognize the specific area 502, this is not limitative, but the specific area 502 may be indicated in any other way such as indication using an arbitrary see-through color, which makes hand-drawing input easier. Moreover, the present embodiment is arranged such that the specific area 502 determined to be a hand-drawn image of which a sequence in the horizontal direction of the touch panel has a meaning is clearly specified, but conversely, may be arranged such that an area determined to be a hand-drawn image input in an input mode coinciding with a subject position is clearly specified.

It should be noted that it may be arranged such that a type of drawing information input in the hand-drawing input mode is determined, and the way of flipping a display on the liquid crystal display 122 is selected according to the type selected as the determination result. Specifically, when a character or a character string is input in the hand-drawing input mode, it may be determined that the character or the character string is an input of which a sequence in the horizontal direction of the touch panel has a meaning. In this case, when a linear drawing such as a figure which is neither a character nor a character string is input, it is determined that this linear drawing is an input coinciding with a subject position. This enables hand-drawing input without being restricted by a display area of the liquid crystal display 122. When this arrangement is adopted, for example, the system control unit 101 should act as a determination unit which determines whether or not a character or a character string has been input or whether or not a linear drawing has been input, or there may be a special determination unit (determination circuit, determination section).

When there is such a determination unit, an image which is input by hand-drawing within a predetermined time period after a character or a character string is input by hand-drawing may be horizontally flipped together with the previously input character or character string even when the image is determined to be a linear drawing such as a figure by the determination unit. Also, an image drawn within a range of a predetermined distance from a character or a character string may be horizontally flipped together with the previously character or character string even when the image is determined to be a linear drawing such as a figure by the determination unit. For example, when a star mark, a face mark, or the like is drawn before or after a character or a character string, a user considers them to be one unit in many cases. Accordingly, by horizontally flipping a character or a character string and a linear drawing such as a figure, which is considered to be attached to the character or the character string, in a collective manner, an intention of a photographer is reflected on a taken image.

Moreover, although in the embodiments described above, a digital video camera is taken up as an example of the image pickup apparatus according to the present invention, the image pickup apparatus according to the present invention is not limited to this. For example, the image pickup apparatus according to the present invention may be a digital still camera, and in this case, processes conforming to the embodiments described above are carried out on a taken image and its image data and drawing information and its data. Further, the present invention may be applied to various types of electronic apparatuses which are able to perform shooting using an image pickup device and have a rotatable display device which displays a taken image and a taken picture and allows input of drawing information from a touch panel. The same processes as those in the above described case where hand-drawing input is done on a taken picture may be applied to the case where hand-drawing input is done on a taken picture or a taken image obtained by shooting a subject using such electronic apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097564, filed May 9, 2014, which is hereby incorporated by reference herein in its entirety.

What is claimed is:

1. An image pickup apparatus comprising:
   a touch panel configured to allow input of drawing information;
   a display unit configured to display a taken image and superimpose the drawing information, which is input through said touch panel, on the taken image;
   a rotating unit configured to rotate said display unit between a reverse display state and a normal display state; and
   a flipping unit configured to flip the drawing information displayed on said display unit in response to switching a state of said display unit between the reverse display state and the normal display state by said rotating unit,
   wherein said flipping unit carries out one of a first flipping process in which the drawing information is vertically flipped or a second flipping process in which the drawing information is vertically flipped and also horizontally flipped according to a type of the drawing information.

2. The image pickup apparatus according to claim 1, wherein when the drawing information is drawn in a first specific area of said display unit, said flipping unit carries out the first flipping process, and when the drawing information is drawn in a second specific area of said display unit which is different from the first specific area, said flipping unit carries out the second flipping process.

3. The image pickup apparatus according to claim 2, further comprising a display control unit configured to clearly specify the first specific area or the second specific area on said touch panel.

4. The image pickup apparatus according to claim 1, further comprising a determination unit configured to determine the type of the drawing information, and wherein according to the type of the drawing information selected as a determination result by said determination unit, said flipping unit switches between the first flipping process and the second flipping process.

5. The image pickup apparatus according to claim 4, wherein when said determination unit determines that the drawing information is a character or a character string, said flipping unit carries out the second flipping process, and when said determination unit determines that the drawing information is a linear drawing, said flipping unit carries out the first flipping process.

6. The image pickup apparatus according to claim 5, wherein when said determination unit determines that the drawing information is a character string, said flipping unit carries out the second flipping process using a center of a horizontal length of the character string as an axis.

7. An image processing method in which, when a taken image is to be displayed on a display unit rotatable between a reverse display state and a normal display state, drawing information input through a touch panel provided on the display unit is superimposed on the taken image, comprising:
   a detecting step of detecting whether the display unit is in the reverse display state or the normal display state; and
   a flipping step of flipping the drawing information displayed on the display unit in response to switching of a state of the display unit between the reverse display state and the normal display state,
   wherein in said flipping step one of a first flipping process, in which the drawing information is vertically flipped, or a second flipping process, in which the drawing information is vertically flipped and also horizontally flipped, is carried out according to a type of the drawing information.

8. The image processing method according to claim 7, wherein in said flipping step, when the drawing information is drawn in a first specific area of the display unit, the first flipping process is carried out, and when the drawing information is drawn in a second specific area of the display unit which is different from the first specific area, the second flipping process is carried out.

9. The image processing method according to claim 7, further comprising a determination step of determining the type of the drawing information, and wherein in said flipping step, switching between the first flipping process and the second flipping process is done according to the type of the drawing information selected as a determination result in said determination step.

10. The image processing method according to claim 9, wherein in said flipping step, when it is determined in said determination step that the drawing information is a character or a character string, the second flipping process is carried out, and when it is determined in said determination step that the drawing information is a linear drawing, the first flipping process is carried out.

11. A non-transitory computer-readable storage medium storing a program for causing a computer to execute an image processing method in which, when a taken image is to be displayed on a display unit rotatable between a reverse display state and a normal display state, drawing information input through a touch panel provided on the display unit is superimposed on the taken image, the image processing method comprising:
   a detecting step of detecting whether the display unit is in the reverse display state or the normal display state; and
   a flipping step of flipping the drawing information displayed on the display unit in response to switching of a state of the display unit between the reverse display state and the normal display state,
   wherein in the flipping step one of a first flipping process, in which the drawing information is vertically flipped, or a second flipping process, in which the drawing information is vertically flipped and also horizontally flipped, is carried out according to a type of the drawing information.

* * * * *